United States Patent
Sanders et al.

[11] Patent Number: 5,807,458
[45] Date of Patent: Sep. 15, 1998

[54] REINFORCING ELEMENTS FOR CASTABLE COMPOSITIONS

[75] Inventors: James F. Sanders, Houlton, Wis.; Larry D. Rich, Oakdale, Minn.; Clifford N. MacDonald, Inver Grove Heights, Minn.; L. Max Hurlocker, White Bear Lake, Minn.

[73] Assignee: Minnesota Mining & Manufacturing Company, St. Paul, Minn.

[21] Appl. No.: 441,186

[22] Filed: May 15, 1995

Related U.S. Application Data

[63] Continuation of Ser. No. 418,906, Apr. 7, 1995, which is a continuation of Ser. No. 58,006, May 3, 1993, abandoned.

[51] Int. Cl.$^6$ ............................................. E04C 5/07
[52] U.S. Cl. .................. 156/276; 428/36.92; 428/373; 428/401; 264/228; 366/2; 366/150.1
[58] Field of Search .................. 428/34.4, 373, 428/401; 206/524.7; 366/2, 150.1; 106/90; 264/228; 156/276

[56] References Cited

U.S. PATENT DOCUMENTS

| | | | |
|---|---|---|---|
| 3,063,558 | 11/1962 | Lesser et al. | 206/84 |
| 3,202,522 | 8/1965 | Yang et al. | 106/99 |
| 3,591,395 | 7/1971 | Zonzveld | 106/99 |
| 3,650,785 | 3/1972 | Ball et al. | 106/90 |
| 3,716,386 | 2/1973 | Kempster | 106/90 |
| 3,834,916 | 9/1974 | Kesler | 106/99 |
| 4,023,706 | 5/1977 | Dearlove et al. | |
| 4,033,781 | 7/1977 | Hauser et al. | 106/90 |
| 4,040,851 | 8/1977 | Ziegler | 106/93 |
| 4,121,943 | 10/1978 | Akazawa et al. | 106/99 |
| 4,132,556 | 1/1979 | Camprincoli et al. | 106/90 |
| 4,159,911 | 7/1979 | Takazuka | 106/99 |
| 4,199,366 | 4/1980 | Schaefer et al. | 106/90 |
| 4,224,377 | 9/1980 | Moens | 428/369 |
| 4,284,667 | 8/1981 | Moens | 427/331 |
| 4,297,409 | 10/1981 | Hannaht | 428/247 |
| 4,314,853 | 2/1982 | Moens | 106/99 |
| 4,363,666 | 12/1982 | Johnson et al. | 106/90 |
| 4,366,255 | 12/1982 | Lankard | 501/95 |

(List continued on next page.)

FOREIGN PATENT DOCUMENTS

| | | |
|---|---|---|
| 0 026 581 | 4/1981 | European Pat. Off. |
| 0 235 577 | 9/1987 | European Pat. Off. |
| 0 557 617 | 9/1993 | European Pat. Off. |
| 1 026 125 | 4/1953 | France . |
| 1 534 302 | 7/1968 | France . |
| 31 46 261 | 6/1983 | Germany . |
| 42 14 540 | 6/1993 | Germany . |
| 2 173 828 | 10/1986 | United Kingdom . |
| 2231574 | 11/1990 | United Kingdom . |
| 2232618 | 2/1993 | United Kingdom . |
| 92 17381 | 10/1992 | WIPO . |
| 95/11861 | 5/1995 | WIPO . |

OTHER PUBLICATIONS

The following papers from the file (i,e., Application No. 852,246, filed Nov. 10, 1977) for U.S. Pat. No. 4,224,377: "Relationship Of Claims Of Present Application To Restriction Requirement In Present Application", Paper Nos. 3 and 4, Restriction Requirement, Paper Nos. 6,7,9,10,12,14, and 15.

The following papers from the file of U.S. Application No. 456,592 (Moens), filed Apr. 1, 1974, from which Application No. 850,246 claims priority (wherein Application No. No. 850,246 issued on Sep. 23, 1980 as U.S. Pat. No. 4,224,377: Paper Nos. 3,5,6,7,8,9,10,11,12,13,14,15,16,17, 18,19, and 20, "Examiner's Answer" (received by the Board of appeals on May 24, 1977), Reply Brief (received by the USPTO on May 16, 1977), and Paper NOs. 23,24,25,26,27, and 29.

(List continued on next page.)

*Primary Examiner*—Charles Nold
*Attorney, Agent, or Firm*—Gregory D. Allen

[57] ABSTRACT

Methods and articles for reinforcing castable compositions through the use of reinforcing elements maintained in a close-packed alignment in a dispersible containment means.

16 Claims, 1 Drawing Sheet

U.S. PATENT DOCUMENTS

| | | | |
|---|---|---|---|
| 4,389,359 | 6/1983 | Brunt et al. | 264/69 |
| 4,414,030 | 11/1983 | Restrepo | 106/90 |
| 4,428,775 | 1/1984 | Johnson et al. | 106/90 |
| 4,440,819 | 4/1984 | Rosser et al. | 428/107 |
| 4,477,522 | 10/1984 | Sheehan | 428/359 |
| 4,524,042 | 6/1985 | Genba et al. | 264/211 |
| 4,524,101 | 6/1985 | Eickman et al. | 428/294 |
| 4,560,411 | 12/1985 | Melchior | 106/90 |
| 4,614,678 | 9/1986 | Ganga | 428/74 |
| 4,627,998 | 12/1986 | Akihama et al. | 428/285 |
| 4,710,540 | 12/1987 | McAlpin et al. | 525/101 |
| 4,781,994 | 11/1988 | Enoki et al. | 428/703 |
| 4,793,861 | 12/1988 | Sohm | 106/99 |
| 4,801,630 | 1/1989 | Chow et al. | 524/5 |
| 4,861,812 | 8/1989 | McAlpin et al. | 524/3 |
| 4,963,151 | 10/1990 | Ducheyne et al. | 623/16 |
| 4,968,561 | 11/1990 | Mizobe et al. | 428/397 |
| 5,032,181 | 7/1991 | Chung | 106/717 |
| 5,047,288 | 9/1991 | Hoshiro et al. | 428/290 |
| 5,091,255 | 2/1992 | Hsu et al. | 428/378 |
| 5,194,106 | 3/1993 | Geary, Jr. et al. | 156/62.6 |
| 5,224,774 | 7/1993 | Valle et al. | 366/2 |
| 5,227,227 | 7/1993 | Boulanger | 428/224 |
| 5,399,195 | 3/1995 | Hansen et al. | 106/711 |

OTHER PUBLICATIONS

Product Brochure titled, "Synthetic Fiber For Industry", Whiting Company of Burlington, Vt, Feb. 17, 1990.

Robinson et al., "Steel Fibers Reinforce Auto Assembly Plant Floor", *Concrete International*, Apr. 1991.

B.H. Gray, "A Discussion of Field Considerations", *Conference Proceedings M 28 (May 1–3, 1972) Fibrous Concrete Construction Material for the 70's*, Dec., 1972, Construction Engineering Research Laboratory, Champagne, Illinois, pp. 41–54.

J. Dixon et al, "Concrete Reinforced with Fibrous Wire", *Concrete*, Mar. 1971, pp. 73–76.

"The Trouble with Fibrous Concrete and What's Being Done About It", *World Construction*, Feb., 1974, pp. 39–40.

Williamson et al., "Technical Information Pamphlet On Use of Fibrous Concrete (Applicability of Fibrous Concrete for Military Facilities)", Preliminary Report M–44, Dept. of the Army Construction Engineering Research Laboratory, May 1973.

"Progress in Fibre Reinforced Concrete", *Civil Engineering and Public Works Review*, Sep., 1973; pp. 745–754.

Houwink et al., *Adhesion And Adhesives*, Second Edition, vol. 1 Adhesives, Elsevier Publishing Co., 1965, pp. 170–175, pp. 178–179, pp. 302–303.

S. Goldfein, "Fibrous Reinforcement For Portland Cement", *Modern Plastic*, Apr. 1965.

"State–of–the–Art Report on Fiber Reinforced Concrete", reported by ACI Committee 544, *ACI Journal*, Nov., 1973, pp. 729–744.

Derwert Abstract for the patent family having priority from DK 785584.

Derwert Abstract for the patent family having priority from DE 2804941.

Derwert Abstract for U.S. Pat. No. 3,896,288.

Derwert Abstract for the patent family having priorty from DE 2729966, DE 7714038 and DE 7740386.

Derwert Abstract for the patent family having priority from GB 7522353.

Derwert Abstract for the patent family having priority from DE 2626660.

Derwert Abstract for the patent family having priority from Us Serial No. 540697, US Serial No. 408309 and CA 216344.

Derwert Abstract for the patent family having priority from GB 7622758, GB 7549890, US Serial No. 746614 and US Serial No. 913072.

Derwert Abstract for Pat. Doc. RD 181017.

Derwert Abstract for Pat. Doc. FR 2220428.

Paper 13 from the file (i.e., Application No. 850, 246, filed Nov. 10, 1977) for U.S. Pat. No. 4,224,377.

Fiber Reinforce Cements and Concretes, edited by R.N. Swamy and B. Barr, Elsvier Applied Science, New York, 1989. pp. 316–325.

Durability Comparisons of Fiber Reinforced Concrete in Chemical Plant Applications, C.N. MacDonald, SP 126–41, pp. 773–782.

Fibermesh™ Micro–Reinforcement System.

Transportation Research Record 1003, "Plastic and Steel Fiber–Reinforced Concrete Applications", MacDonald, pp. 1–3.

Technical Report No. 2–40, "Fibrous Reinforcements For Portland Cement Concrete", May 1965.

REINFORCING ELEMENTS FOR CASTABLE COMPOSITIONS

This is a continuation of application Ser. No. 08/418,906, filed Apr. 7, 1995, pending which is a continuation of 08/058,006, filed May 3, 1993, now abandoned.

The present invention relates to the reinforcement of castable compositions.

BACKGROUND

It is well known that the performance of castable compositions can be improved by the incorporation of reinforcing elements. For example, reinforcing elements are incorporated into cementitious compositions such as mortar and concrete to improve their strength or to reduce surface cracking tendencies. Reinforcing elements encompass a broad range of shapes, but they typically share an elongate structure (ie., the dimension of a major axis is significantly larger than the dimension of the minor axis). The elongate structures include rod-like filaments having substantially round cross-sections, flat strips having a helically twisted structure or made with a varying cross-section to reduce pull-out tendencies, or cable-like constructions based on twisted constructions of rod-like filaments. Materials used as reinforcing elements include metals, synthetic polymeric materials, and naturally occurring materials.

In cementitious compositions (ie. mortar or concrete), it is known that the impact strength, flexural strength and toughness of the material improves with increasing percentages of the reinforcing elements in the composition. There is, however, a practical limit to the level of reinforcing elements that can be introduced as above this limit, the reinforcing elements tend to entangle with each other, forming balls or other undesirable conglomerates.

Proper selection of criteria relating to the length and diameter (eg. aspect ratio) of the reinforcing elements can help reduce their tendency to agglomerate. Achieving improved mixability by this technique is difficult, however, as these types of changes negatively impact the reinforcing capabilities of the elements.

The method of delivering reinforcing elements into cementitious compositions also plays a major role in realizing high incorporation levels of reinforcing elements. For example, high aspect ratio reinforcing elements must be introduced into cementitious compositions as substantially individual fibers and in very low concentrations over an extended period of time with very good mixing if high volume concentrations of reinforcing elements are desired.

Rod shaped reinforcing elements can become entangled and/or agglomerated in their shipping containers as a result of the vibration and jostling encountered during shipping. Agglomerated elements are not readily pourable from their shipping containers and cannot be added to cementitious compositions until the agglomerates have been broken up into individual elements. Various mechanical and pneumatic techniques have been employed to break-up the agglomerated masses and introduce the individual elements into the cementitious mix as a rain of elements. U.S. Pat. No. 4,121,943 (Akazawa et al.) describes a machine designed to separate reinforcing fibers into separate units prior to introducing them into the cementitious mix.

An alternative approach to incorporating high levels of reinforcing elements into cementitious compositions is described in U.S. Pat. No. 3,716,386 (Kempster), where fibers are treated with a high viscosity, friction reducing substance prior to the reinforcing elements being introduced into the mix.

A factor common to a number of recent approaches to achieving high incorporation levels of high aspect ratio elongate reinforcing elements (ie. fibers) into cementitious compositions is to introduce the fibers into the compositions in an organized, aligned array that, on mixing, slowly releases the fibers in an aligned array. Fibers released into cementitious compositions in this manner experience fewer fiber-fiber interactions and subsequently show less tendency toward agglomeration or balling as compared to fibers introduced into the compositions in a totally random orientation. U.S. Pat. Nos. 4,224,377 and 4,314,853 (Moens) describe a reinforcing member comprising a plurality of wire elements which are united by a binder which loses its binding ability during the mixing process, and a process for incorporating these members into cementitious compositions. U.S. Pat. No. 4,414,030 (Restrepo) describes reinforcing elements for cementitious compositions comprising ribbons of fibrillated polyolefin film. The fibrillated fibers are maintained in an aligned configuration by inter-fiber fibrils which are broken by mechanical mixing, thereby releasing individual fibers into the cementitious composition in an aligned configuration.

Another alternative to introducing fibers into cementitious compositions in an aligned configuration is described in Fiber Reinforced Cements and Concretes, edited by R. N. Swamy and B. Barr, Elsvier Applied Science, New York, 1989. pp 316–325. This processes utilizes short fibrillated polypropylene fiber strips which are twisted to produce a cable-like structure to deliver the fibers to cementitious compositions. The mechanical mixing action of processing the cementitious composition breaks the cable-like structure apart, releasing individual fibrillated film fibers into the mix in an aligned manner.

SUMMARY OF THE INVENTION

The present invention relates to a unitized package of reinforcing elements for castable compositions comprising a liquid/solid or liquid mixtures. The unitized package comprises a dispersible packaging means, the dispersion of which is effected by the combined action of a dispersing agent present in the castable composition and substantially concurrent mechanical mixing of the mixture of the castable composition and the unitized package. The packaging means consolidates a multiplicity of primary packages of reinforcing elements, the primary packages of reinforcing elements comprising a plurality of elongate reinforcing elements which are maintained in a close-packed, side-by-side alignment by a primary dispersible containment means. The primary containment means comprises a perimeter wrap maintained under sufficient tension to substantially restrict lateral movement of said elongate reinforcing elements relative to one another. Continuity of the primary containment means is controllably disrupted by dispersion of at least a portion thereof, the dispersion of the primary containment means effected by the combined action of a dispersing agent present in the castable composition and substantially concurrent mechanical mixing of the mixture of the primary packages of reinforcing elements in the castable composition. Disruption of the continuity of the primary containment means releases the elongate reinforcing elements and allows uniform mixing of the elements into the castable composition.

Another embodiment of the present invention presents a process for preparing a castable composition comprising a liquid/solid or liquid mixture, the mixture comprising a multiplicity of elongate reinforcing elements or fiber, the elements or fibers being subject to entanglement when introduced loosely into the castable composition. The process comprises the steps of: a) Preparing a mixture of ingredient materials for the castable composition; b) Introducing at least one primary package of elongate reinforcing elements into the mixture, the package of reinforcing elements comprising a plurality of elongate reinforcing elements maintained in a close-packed, side-by-side alignment by a primary dispersible containment means, the primary containment means comprising a perimeter wrap maintained under sufficient tension to substantially restrict lateral movement of said elongate reinforcing elements relative to one another. The continuity of the primary containment means is capable of being controllably disrupted by dispersion of at least a portion thereof, the dispersion of the primary containment means being effected by the combined action of a dispersing agent present in the castable composition and the substantially concurrent mechanical mixing of the mixture of the at least one primary package of reinforcing elements; c) Mixing the mixture of the castable composition and the at least one primary package of reinforcing elements to distribute substantially uniformly the at least one primary package of reinforcing elements into the castable material and to subsequently disrupt the continuity of the primary containment means, thus releasing the elongate reinforcing elements into the castable composition; and, d) Continuing to mix the mixture of the castable composition and the elongate reinforcing elements until the elongate reinforcing elements are distributed substantially uniformly throughout the castable composition.

DEFINITIONS

As used herein:

"castable composition" means flowable compositions that can be cast as such or can be applied to surfaces by alternative techniques such as shotcrete process used with cementitous compositions;

"liquid/solid" means compositions comprising a mixture of two or more liquid and solid components; and "liquid mixture" means compositions comprising a curable liquid and optionally other liquid or dissolved components.

DETAILED DESCRIPTION OF THE INVENTION

Reinforcing elements for castable compositions, and particularly for cementitous compositions, frequently have a much higher aspect ratio than the typical components of cementitous compositions. This disparity in aspect ratio makes uniform incorporation of reinforcing elements into cementitous compositions, particularly at high volume percentages of reinforcing elements, very difficult.

The present invention relates to a novel, unitized package of elongate reinforcing elements that allows the addition of high volume percentages of reinforcing fibers to cementitous compositions in a single step while producing a substantially uniform incorporation of the individual reinforcing elements throughout the cementitous composition without "balling" or similar undesirable agglomeration formation. The present invention also relates to a process for preparing reinforced castable compositions using the unitized package of elongate reinforcing elements of the invention.

Figure 1:
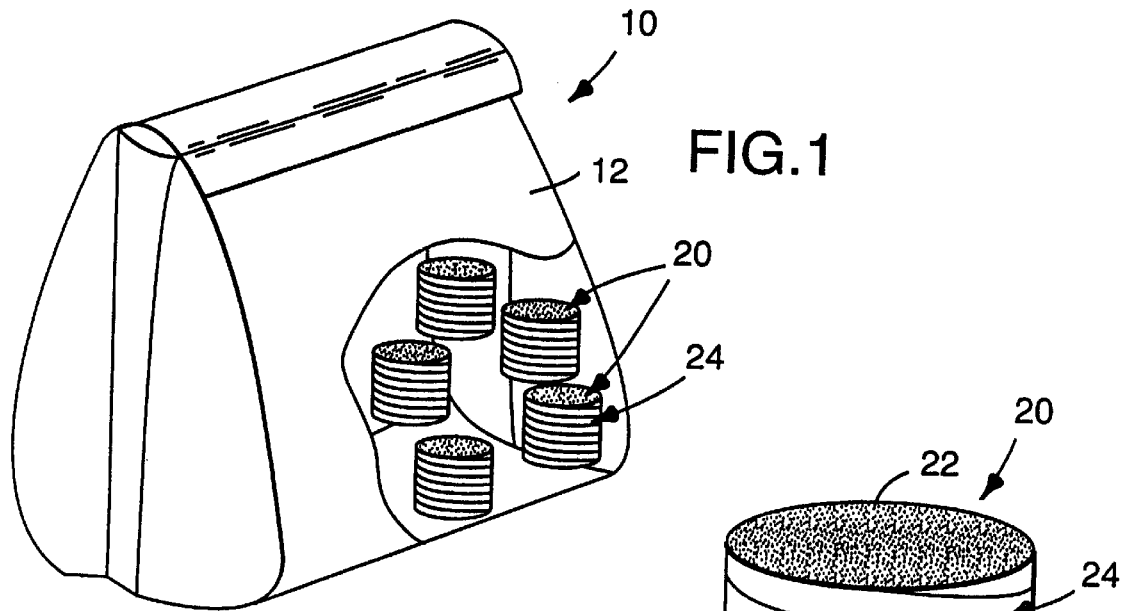
FIG. 1 is an illustration of a unitized package of reinforcing elements according to the present invention.

As illustrated in FIG. 1, the unitized package 10 of the present invention consolidates a multiplicity of primary packages of reinforcing elements 20 in a dispersible containment means 12 that can be added to castable cementitous compositions in its entirety. The dispersible containment means comprises compositions whose continuity can be disrupted, at least in part, so as to release the contents of the package, by the combined action of a dispersing agent present in the cementitous composition and concurrent mechanical mixing action. Compositions suitable for use in aqueous cementitous compositions include, but are not limited to cellulose based papers, cellulose based papers saturated or coated with water swellable or water dispersible binders, etc. Suitable water swellable or water dispersible binders that can be used in conjunction with the water dispersible containment means include, but are not limited to polysaccharides, gelatin, and poly(meth)acrylic acid. The water swellable or water dispersible binders can be applied to the water dispersible containment means by any of several techniques commonly used to apply binders to paper-like web constructions, including, but not limited to roll coating, squeeze roll saturation, knife coating, and gravure coating processes. The dispersibility, or time required to disrupt the continuity of at least a portion of the unitized package sufficiently to cause its contents to be released, can be controlled by the basis weight of the water dispersible packaging means, the type of binder and the binder incorporation level.

Figure 2:
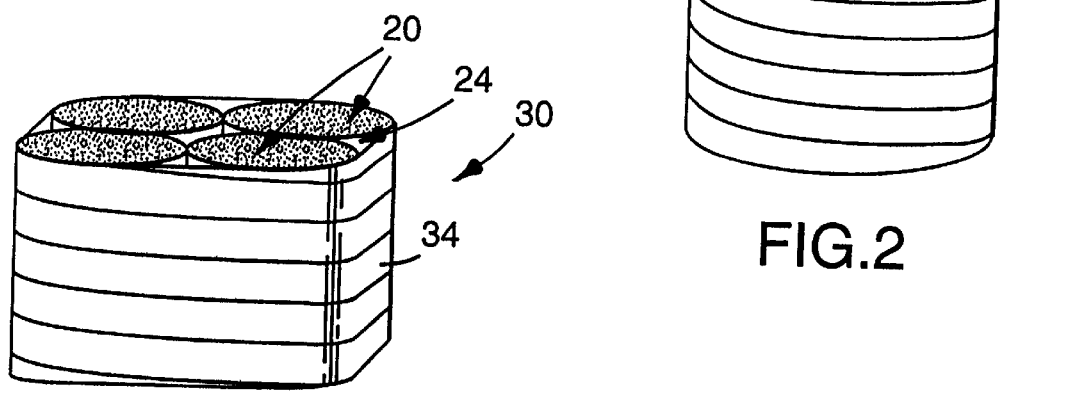
FIG. 2 is an illustration of a package of elongate reinforcing elements, including a primary containment means, according to the present invention.

The primary packages of reinforcing elements 20 of FIG. 2 which are contained within the unitized package 12 comprise a plurality of elongate reinforcing elements 22 maintained in a close-packed, side-by-side alignment by a perimeter wrap of a primary containment means 24 comprising compositions whose continuity can be disrupted, at least in part, so as to release the contents of the package, by the combined action of a dispersing agent present in the cementitous composition and substantially concurrent mechanical mixing action. Compositions suitable for use in aqueous cementitous compositions include, but are not limited to cellulose based papers, cellulose based papers saturated with water swellable or water dispersible binders, and water dispersible PSA tape constructions. Suitable water swellable or water dispersible binders that can be used in conjunction with the water dispersible containment means include, but are not limited to polysaccharides, gelatin, and poly(meth)acrylic acid. The water swellable or water dispersible binders can be applied to the water dispersible containment means by any of several techniques commonly used to apply binders to paper-like webs constructions, including, but not limited to roll coating, squeeze roll saturation, knife coating, and gravure coating processes. The dispersibility, or time required to disrupt the continuity of the primary containment means sufficiently to cause the release the reinforcing elements, can be controlled by the basis weight of the water dispersible packaging means, the type of binder and the binder incorporation level.

Cylindrical primary packages of fibrous reinforcing elements 20 can be readily fabricated from a fiber tow or a hank by wrapping the tow or hank with a strip of primary containment means material in a spiral overlap manner to form a core of reinforcing elements 22 with a perimeter wrap of a water dispersible containment means and cutting the tow or hank to produce reinforcing elements of the desired length. The dispersion of the primary packages of reinforcing elements 20 can be extended by utilizing a higher basis weight primary containment means, by utilizing a primary containment means having a higher binder add-on, or simply by increasing the amount of overlap or the number of overlapping layers of the primary containment means 24.

Figure 3:
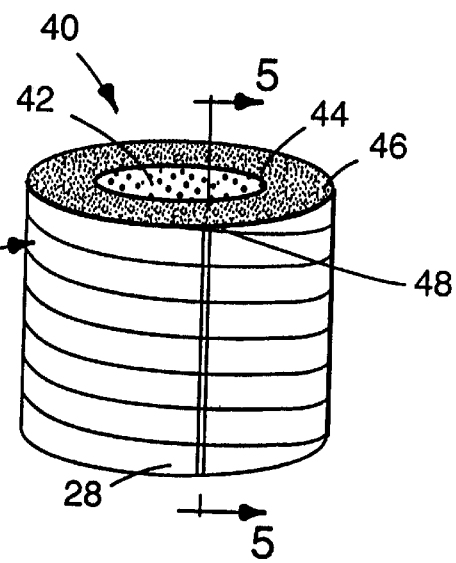
FIG. 3 is an illustration of an alternative package of elongate reinforcing elements, including a primary containment means, according to the present invention.

An alternative primary package of reinforcing elements 30 is shown in FIG. 3, wherein four separate primary packages of reinforcing elements 20 have been incorporated into a single package by an additional perimeter wrap 34. Perimeter wrap 34 may comprise a separate wrap or, alternatively, it may comprise an extension of the perimeter wrap 24 of one of the packages of reinforcing elements 20. Primary reinforcing element packages 20 may all contain the same reinforcing elements or each package may contain different size reinforcing elements.

Figure 4:
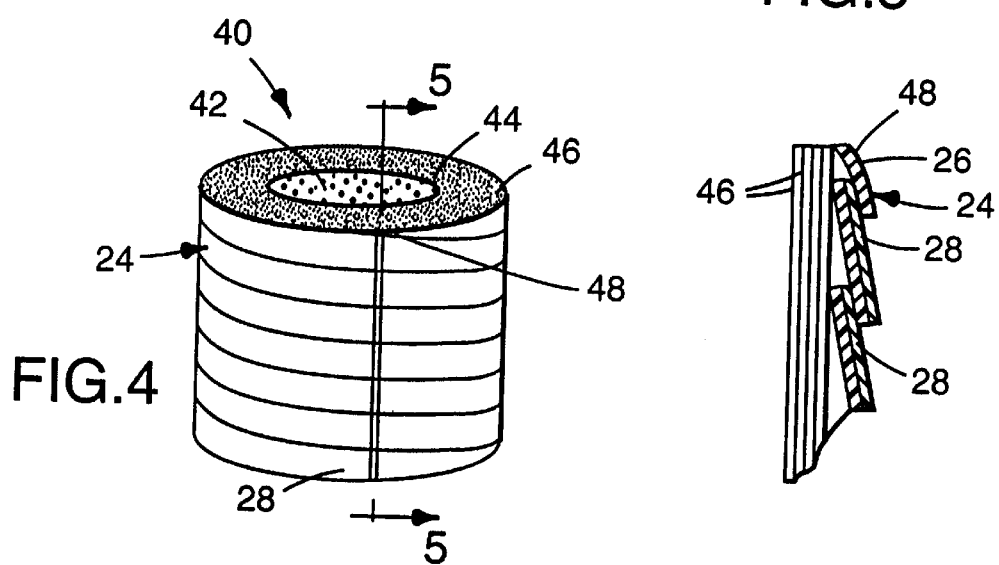
FIG. 4 is an illustration of an alternative package of elongate reinforcing elements incorporating two different sizes of reinforcing elements, according to the present invention.

A third alternative primary package of reinforcing elements 40 is shown in FIG. 4, wherein a central core package of reinforcing elements 42 confined by perimeter wrap 44 is surrounded by a concentric assembly of a second reinforcing element 46 having a different diameter or cross-section. Alternative packaging options illustrated in FIGS. 3 and 4 allow the introduction of a customized blend of reinforcing elements into a cementitous composition by the use of a single primary package of reinforcing elements.

Referring to FIG. 4, primary containment means 24 may exhibit sufficient cohesive attraction to itself to keep terminal end 48 of the top overlapping strip from unwinding after the fiber tow or hank has been cut to produce primary packages of reinforcing elements. In the event that there is insufficient cohesive attraction between adjacent layers, an optional dispersible adhesive 28 may be applied across the width of outer face 26 of primary containment means 24 as, for example, a strip of a dispersible hot melt adhesive or strip of a dispersible transfer adhesive, as primary containment means 24 is being wrapped around reinforcing elements 46. Dispersible adhesive 28 should be selected so that it is dispersible by the same dispersing agent used to disperse primary containment means 24 or another dispersing agent which is compatible with the castable composition to which the primary package(s) of reinforcing elements is being added.

Figure 5:
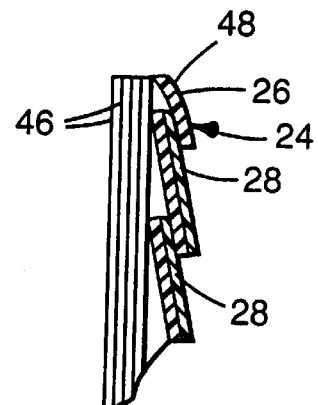
FIG. 5 is a fragment of FIG. 4 taken along 55 illustrating a method of securing perimeter wrap of primary containment means 24.

As shown in FIG. 5, which is a fragment of FIG. 4 along 55, fibrous reinforcing elements 46 are contained by primary containment means 24. Terminal end 48 of the top overlapping layer of primary containment means 24 is secured to the adjacent layer of primary containment means 24 by an optional strip of dispersible adhesive 28 which forms a strip coextensive with the longitudinal axis of reinforcing elements 46 (more clearly seen by referring to FIG. 4). Dispersible adhesive 28 is preferably applied to the outer face 26 of primary containment means 24 so that it does not contact reinforcing elements 46.

It is also contemplated that a dispersible shrink wrap material might be utilized for the perimeter wrap for the primary containment means. In addition to providing the shrink wrap capability, suitable materials would also have to exhibit substantially similar dispersibility performance to the materials described above.

Regardless of the shape or design of the primary package of reinforcing elements, the perimeter wrap around each package is maintained under sufficient tension to substantially restrict the lateral movement of the elongate reinforcing elements relative to one another. This restriction of lateral movement of reinforcing elements relative to one another is preferred to prevent premature release of the reinforcing elements, either during shipping or during addition to castable compositions. In addition to providing a convenient and organized manner of introducing the reinforcing elements into castable compositions by effecting a significant reduction in the volume of reinforcing elements introduced into cementitous compositions at a critical mixing point, the packaging also provides a distinct shipping advantage in that it maintains the reinforcing elements in a configuration that will not permit agglomeration during shipping. Additionally, the primary package is significantly more dense than a comparable volume of unconsolidated elements, thereby allowing a significantly greater weight of elements to be shipped in the same volume occupied by the unconsolidated elements.

Cylindrical packages of reinforcing elements can range in height from about 0.25 cm to about 20 cm, preferably from about 1.0 cm to 10 cm, and from about 0.25 cm to about 20 cm, preferably from about 1.0 cm to 10 cm in diameter. Even though this size range can result in packages having a significant disparity in size and shape relative to other components of typical cementitous compositions, the packages of reinforcing elements are readily mixed into the cementitous compositions in a substantially uniform manner.

Upon disruption of the continuity of the perimeter wrap and the resulting tension it has maintained on the reinforcing elements, the elements are rapidly dispersed into the cementitous mixture with minimal, if any agglomeration. While not being bound by any theory, it is presumed that this lack of agglomeration is due, in part, to the fact that the reinforcing elements are maintained in a organized, substantially parallel arrangement on release. On being released, the elements continue to act in an aligned fashion, further enhancing substantially uniform macro-distribution of the elements throughout the cementitous composition until the individual elements are wetted and dispersed.

It has been observed that even though the perimeter wraps are substantially identical on each primary package of reinforcing elements, they exhibit a range of dispersing times. This range in dispersion times allows the addition of a high concentration of reinforcing elements, in the form of the primary package of reinforcing elements, to cementitous compositions as a single charge. Reinforcing elements are subsequently released from the primary packages in a controlled manner such that there is minimal, if any, agglomeration and the reinforcing elements are distributed throughout the cementitous compositions in a substantially uniform manner.

This proposed incorporation mechanism stands in contrast to the introduction of individual elements into cementitous compositions in a totally random orientation that would allow inter-fiber interactions and subsequent agglomeration of the elements.

Preferably the primary packages of reinforcing elements are free from binders that bind individual reinforcing elements together (ie. inter-element binders). The absence of inter-element binders facilitates a more rapid dispersion of the elements as the binder does not have to dissolve to allow release of the individual elements.

The present invention also contemplates a process for the incorporation of elongate reinforcing elements into castable compositions, the process comprising the steps of: a) Preparing a mixture of ingredient materials for the castable composition; b) Introducing at least one primary package of elongate reinforcing elements into the mixture, the primary package of reinforcing elements comprising a plurality of elongate reinforcing elements maintained in a close-packed, side-by-side alignment by a primary dispersible containment means, the primary dispersible containment means comprising a perimeter wrap maintained under sufficient tension to restrict lateral movement of said elongate reinforcing elements relative to one another. The continuity of the primary dispersible containment means is capable of being controllably disrupted by dispersion of at least a portion thereof, the dispersion of the primary dispersible containment means being effected by the combined action of a dispersing agent present in the castable composition and substantially concurrent mechanical mixing of the mixture of the at least one primary package of reinforcing elements; c) Mixing the mixture of the castable composition and the at least one primary package of reinforcing elements to distribute substantially uniformly the at least one primary package of reinforcing elements into the castable material and to subsequently disrupt the continuity of the primary dispersible containment means, thus releasing the elongate reinforcing elements into the castable composition; and, d) Continuing to mix the mixture of the castable composition and the elongate reinforcing elements until the elongate reinforcing elements are distributed substantially uniformly throughout the castable composition.

The process contemplates the introduction of one or more unitized packages of reinforcing elements into a castable composition, depending on the level of reinforcing elements required for the composition. A mixture of sizes of reinforcing elements can be introduced into the composition by a) incorporating primary packages of different sized elements in each unitized package, or b) by utilizing unitized packages containing only one size of reinforcing elements, but adding unitized packages containing different sized elements in the appropriate ratio to achieve the desired final composition.

In another embodiment, the process also contemplates the addition of primary packages of reinforcing elements as individual packages rather than using the unitized package previously described. Customized reinforcing element blends could readily be prepared using individual primary packages simply by weighing or counting out the appropriate number of primary packages of differing size or structure and adding the mixture to the castable composition. Mixing times might be shortened using this embodiment as additional time to disrupt the continuity of the unitized package would not be required.

The dispersing agent may be present in the mix of components of the castable composition (water in the case of a cementitous composition) prior to the addition of the unitized package of reinforcing elements, or, alternatively, the dispersing agent may be added to the castable composition subsequent to the addition of the unitized package of reinforcing elements. Addition of the dispersing agent subsequent to the addition of the unitized package can afford a longer time for the unitized packages to be substantially uniformly incorporated into the castable composition before initiating the disruption of the dispersible packaging means and the perimeter wrap material. In either case, mechanical mixing action supplied by the mixing of the mixture of the unitized package and the castable composition substantially concurrent with the presence of the dispersing agent is required to achieve dispersion of both the packaging means and the primary containment means materials.

It is desirable to control the dispersion time of the perimeter wrap so that the disruption of its continuity does not occur prior to the disruption of the continuity of the packaging means. Premature release of the reinforcing elements while they are still contained within the unitized package could result in undesirable agglomeration of the reinforcing elements.

It should be understood that the present invention contemplates the use of the unitized package of reinforcing elements and the process of incorporating the reinforcing elements into the castable composition in other castable compositions, including, but not limited to reinforced polymeric compositions (either thermoplastic or thermoset compositions) and ceramics. When nonaqueous based compositions are utilized, alternative packaging and perimeter wrap materials whose continuities can be disrupted by dispersing agents compatible with the castable composition would be substituted for the water dispersible packaging and perimeter wrap materials. A representative nonaqueous construction incorporates a polystyrene perimeter wrap for use in a styrene based composition. It should also be understood that packaging and perimeter wrap materials which are sensitive to dispersing agents other than water can be utilized in aqueous based castable compositions as long as the dispersing agent is compatible with the castable composition.

EXAMPLES

Reinforcing Fiber I

Drawn polypropylene fibers (4:1 draw ratio) having a diameter of 0.81 mm (0.032 inches) was cut into 5.1 cm (2.0 inch) lengths and stored in a plastic bag for later use. The density of the loose fibers was approximately 50 gm/liter (0.5 lb/gallon).

Reinforcing Fiber II

Drawn polypropylene fibers (4:1 draw ratio) having a diameter of 0.13–0.2 mm (0.005–0.08 inch, available from Ketema Co., Specialty Filaments Division, Odenton, Md.) was cut into 5.1 cm (2.0 inch) lengths and stored in a plastic bag for later use.

Reinforcing Element Package I

Approximately 180 cm (71 inches) long samples of Reinforcing Fiber I were formed into hanks of approximately 5.1 cm (2.0 inches) in diameter and wrapped with 5.1 cm (2.0 inch) wide 3M Brand Repulpable Tape #9023 (an alkali dispersible tape available from 3M, St. Paul, Minn.) in a spiral wrap with an approximately 0.6 cm (0.25 inch) overlap on each wrap. The wrapped hank was then cut into 5.1 cm (2.0 inch) lengths using a guillotine cutter to obtain bundles of reinforcing fibers. The density of the fiber bundle was approximately 20 gm/liter (2.4 lb/gallon).

Reinforcing Element Package II

Reinforcing Element Package II was formed according to the procedure used for Reinforcing Element Package I except that Reinforcing Fiber II was used as the fiber.

Example 1

A mortar mix comprising Portland cement (22 kg, 48 pounds), sand (123 kg, 270 pounds) and water (17 kg, 38 pounds) was added to a 0.17 m³ (6 ft³) capacity concrete mixer and mixed until a homogeneous mixture was obtained. Reinforcing Element Package I (3.5 kg, 7.7 pounds, 7 volume percent) were added to the mixture as a single charge. The packages were observed to uniformly mix into the mortar mix and then break open, releasing the reinforcing fibers over a period of approximately 7 minutes. Mixing was continued for an additional 20 minutes, or a total mixing time of about 30 minutes. Minimal free fibers were observed in the mix and there was no evidence of fiber ball formation.

Comparative Example C-1

The procedure of Example 1 was repeated except that the reinforcing fiber was added as loose fibers. Loose Reinforcing Fiber I (3.5 kg, 7.7 pounds, 7 volume percent) was added to the mortar mixture in approximately 0.25 kg increments and the mixture allowed to mix for approximately 4 minutes before the next increment was added. The total mixing time was about 60 minutes. If the loose fibers were added in any larger increments they irreversibly agglomerated into fiber balls.

Example 2

Reinforcing Fiber I, (61 kg, 135 pounds, 3 volume percent) was added to a 2.3 m³ (3 yd³) high strength concrete mix comprising sand (2,333 kg, 5138 pounds), coarse aggregate (1,702 kg, 3750 pounds), Portland cement (810 kg, 1782 pounds), water (359 kg, 789 pounds), fly ash (205 kg, 450 pounds), water reducer (6 liters, 204 ounces) and an air entrainment additive (0.41 liters, 14 ounces) in a Ready Mix truck in a slow continuous manner over a 30 minute period. The resulting composition was mixed for an additional 10 minutes, after which approximately 1.5 m³ (2 yd³) of the mix was removed. Some irreversible agglomeration of fibers into balls was observed even though the fibers were carefully added over a period of approximately 30 minutes. An additional 7 kg (15 pounds) of Reinforcing Element Package I, which corresponded to an additional 1 volume percent, were added to the remaining 0.76 m³ (1 yd³) as a single charge and mixing continued an additional 20 minutes. No additional fiber balling was observed subsequent to the addition of the packages of reinforcing elements, even though the concrete mix was in an unstable condition which would promote ball formation.

Example 3

The procedure of Example 1 was repeated except that Reinforcing Element Package II (1.1 kg, 2.4 pounds, 2 volume percent) was added to the mix as a single charge. The packages were uniformly mixed into the composition and began to break open and release the fibers after a period of approximately 3 minutes. A visual examination of the mix after mixing an additional 7 minutes (10 minutes total mixing time) showed no evidence of unopened packages of reinforcing elements. Samples were taken from the mix after a total mixing time of approximately 20 minutes, the samples cast and cured and subsequently examined for fiber distribution in the mix. Examination of the cast samples showed uniform fiber distribution and no evidence of fiber ball formation.

Comparative Example C-2

The procedure of Example 3 was repeated except that the reinforcing fiber was added as loose fibers. Loose, unentangled Reinforcing Fiber II (0.51 kg, 1.1 pound, 1 volume percent) was added to the mortar mixture in approximately 0.26 kg increments (0.5 pounds) and the mixture allowed to mix for approximately 10 minutes before the next increment was added. The total mixing time was about 20 minutes. Attempts to add more loose fiber to reach a 1.5 vol. % fiber resulted in fiber ball formation. Even though a smaller amount of fiber was added to the mix over a longer period of time, the resulting mix showed evidence of undesirable fiber agglomeration as compared to Example 3.

We claim:

1. A method of reinforcing a castable composition comprising the steps of:
    introducing into a castable composition under dispersion conditions one or more dispersible fiber packages each comprising a plurality of polymeric fibers maintained in a substantially aligned arrangement by means of a perimeter wrap, said fibers being subject to entanglement when introduced loosely into said castable composition,
    each of said fiber packages being substantially free of inter-fiber binding; and
    controllably disrupting each of said packages to release fibers from each of said packages into said castable composition in a substantially unentangled manner.

2. The method of claim 1 comprising releasing essentially all of the fibers within an individual package substantially simultaneously in the form of individual fibers upon disruption of said package.

3. The method of claim 1, wherein said dispersion conditions comprise mechanical agitation of said castable composition.

4. The method of claim 1, wherein said dispersion conditions comprise one or more dispersing agents incorporated in said castable composition.

5. The method of claim 4, wherein said dispersing agent comprises water.

6. The method of claim 4, wherein said dispersing agent comprises a chemical dispersing agent.

7. The method of claim 1, comprising releasing into said castable composition a total of greater than about 1 volume percent of fibers based upon the total volume of said castable composition.

8. The method of claim 1, comprising releasing into said castable composition a total of at least 1.5 volume percent of fibers based upon the total volume of said castable composition.

9. The method of claim 1, comprising releasing into said castable composition a total of at least about 2 volume percent of fibers based upon the total volume of said castable composition.

10. The method of claim 1, comprising releasing into said castable composition a total of at least about 3 volume percent of fibers based upon the total volume of said castable composition.

11. The method of claim 1, comprising releasing into said castable composition a total of at least about 7 volume percent of fibers based upon the total volume of said castable composition.

12. The method of claim 1, wherein substantially all of said fibers having a diameter ranging about 0.127 mm to about 0.81 mm.

13. The method of claim 1, wherein each of said packages has a height ranging from about 0.25 cm to about 20 cm, and a diameter ranging from about 1.0 cm to about 10 cm.

14. The method of claim 1, wherein said castable composition comprises a cementitious composition.

15. Cured castable composition obtained utilizing the method of claim 1.

16. A method for reinforcing a castable composition comprising the steps of:

introducing into a castable composition under dispersion conditions a plurality of fiber packages releasably held together in the form of a dispersible unitized package, each of said packages comprising a plurality of polymeric fibers maintained in a substantially aligned arrangement by means of a perimeter wrap, said fibers being subject to entanglement when introduced loosley into said castable composition each of said fiber packages being substantially free of inter-fiber binding; and controllably disrupting each of said packages to release fibers from each of said packages into said castable composition in a substantially unentangled manner.

* * * * *